(12) United States Patent
Kanai (10) Patent No.: US 10,872,138 B2
(45) Date of Patent: Dec. 22, 2020

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Yasunori Kanai, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 16/135,522

(22) Filed: Sep. 19, 2018

(65) Prior Publication Data
US 2019/0087565 A1    Mar. 21, 2019

(30) Foreign Application Priority Data
Sep. 20, 2017   (JP) ................................. 2017-180347

(51) Int. Cl.
| | |
|---|---|
| *G06F 21/45* | (2013.01) |
| *G06F 21/36* | (2013.01) |
| *G06F 21/46* | (2013.01) |
| *G06F 21/71* | (2013.01) |
| *G06K 15/00* | (2006.01) |
| *H04W 12/06* | (2009.01) |
| *G06K 15/02* | (2006.01) |

(52) U.S. Cl.
CPC .............. *G06F 21/36* (2013.01); *G06F 21/45* (2013.01); *G06F 21/46* (2013.01); *G06F 21/71* (2013.01); *G06K 15/1813* (2013.01); *G06K 15/4095* (2013.01); *H04W 12/06* (2013.01); *G06K 15/00* (2013.01)

(58) Field of Classification Search
CPC ........ G06F 21/30; G06F 21/305; G06F 21/44; G06F 21/36; G06F 21/45; G06F 21/46; G06F 21/70; G06F 21/71; G06K 15/1813; G06K 15/4095; G06K 15/00; H04W 12/06
See application file for complete search history.

(56) References Cited

U.S. PATENT DOCUMENTS

| | | | | |
|---|---|---|---|---|
| 6,647,498 | B1 * | 11/2003 | Cho ........................ | G06F 21/31 713/183 |
| 2002/0120845 | A1 * | 8/2002 | Cromer ................... | G06F 21/57 713/168 |
| 2005/0015629 | A1 * | 1/2005 | Wang ...................... | G06F 21/31 726/19 |
| 2009/0232520 | A1 | 9/2009 | Matsui | |
| 2011/0242579 | A1 | 10/2011 | Pinney | |

(Continued)

FOREIGN PATENT DOCUMENTS

| | | |
|---|---|---|
| JP | 2009-220317 A | 10/2009 |
| JP | 2011-216089 A | 10/2011 |

(Continued)

*Primary Examiner* — Malcolm Cribbs
(74) *Attorney, Agent, or Firm* — Canon U.S.A., Inc., IP Division (57) ABSTRACT

An apparatus and method for setting authentication information of an information processing apparatus is provided. When a setting of a password to a PostScript (PS) interpreter is performed by a PS command, the password is stored in a volatile memory. When the setting of a password to the PS interpreter is performed through a setting screen, the password is stored in a nonvolatile memory, and thereafter, stored in the volatile memory.

19 Claims, 6 Drawing Sheets

(56) References Cited

U.S. PATENT DOCUMENTS

| | | | |
|---|---|---|---|
| 2013/0208297 A1* | 8/2013 | Kawanishi | G06K 15/1817 358/1.14 |
| 2015/0052341 A1 | 2/2015 | Saiki | |
| 2016/0004482 A1 | 1/2016 | Shinnae | |
| 2016/0004851 A1* | 1/2016 | Suzuki | G06F 21/31 726/7 |

FOREIGN PATENT DOCUMENTS

| | | |
|---|---|---|
| JP | 2016-189047 A | 11/2016 |
| JP | 2017-068682 A | 4/2017 |

\* cited by examiner

INFORMATION PROCESSING APPARATUS, INFORMATION PROCESSING METHOD, AND RECORDING MEDIUM

BACKGROUND OF THE INVENTION

Field of the Invention

The present disclosure relates to an information processing apparatus, an information processing method, and a recording medium.

Description of the Related Art

Most image forming apparatuses include a page description language (PDL) interpreter which performs language interpretation on print data described in PDL. The PDL interpreter has a number of parameters for controlling operation and behavior of itself. Examples of the parameters include a parameter for defining a capacity of memory to be used for font cache in POSTSCRIPT (MaxFontCache). These parameters which define an operation control of the PDL interpreter may be changed by any user in accordance with a language specification of PDL.

Japanese Patent Laid-Open No. 2011-216089 discloses control of parameters for defining operation and behavior of a PDL interpreter. According to the technique, an access policy for accessing the PDL interpreter is defined for each user so that only a permitted user may access the PDL interpreter. Accordingly, the parameters for defining operation control of the PDL interpreter are prevented from being unintentionally updated.

In POSTSCRIPT (PS), when the interpreter interprets PS data including a PS command below, a definition of MaxFontCache indicating a memory size to be used for font cache may be changed to 3500000.
«/MaxFontCache 3500000/Password(xxxx)»setsystemparams As a language specification of PS, in such a case where a system parameter is to be changed, a password of the PS interpreter (SystemParamsPassword that is, "xxxx" in the example above) is required to be specified using "/Password" as the example above. If the password of the PS interpreter (hereinafter referred to as a "PS password") is not appropriate, the system parameter is not changed.

The PS password may be changed by a PS command. When the interpreter interprets PS data including the following command, the PS password is changed.
«/Password(oldpassword)/SystemParamsPassword(newpassword)»setsystemparams In the example above, "oldpassword" indicates a PS password which is currently set and "newpassword" indicates a PS password after the change. If a designation of "oldpassword" is inappropriate, the PS password is not changed.

Furthermore, the PS password set in the PS interpreter is stored in a volatile region.

Therefore, when an image forming apparatus is rebooted, the PS password of the PS interpreter becomes a default setting, that is, "no setting". In the state of "no setting", any password may be specified as the PS password required when system parameters of the PS interpreter is to be changed, and the system parameters may be changed by any password.

Therefore, a method for setting a PS password in a PS interpreter in advance is employed so that the system parameters for controlling behavior of the PS interpreter are not unnecessarily changed.

However, the PS password set in the PS interpreter is stored in a volatile region, and therefore, the PS password returns to the default state, that is, "no setting", when the image forming apparatus is rebooted. Accordingly, after the image forming apparatus is rebooted, a malicious user may change settings of the image forming apparatus before the PS password is reset.

SUMMARY OF THE INVENTION

According to an aspect of the present disclosure, an information processing apparatus including an interpreter which interprets a page description language (PDL) command described by a predetermined PDL includes a memory device that stores a set of instructions, and at least one processor that executes the set of instructions to receive a first PDL command including an instruction to set authentication information to the interpreter, store the authentication information set in accordance with the first PDL command in a volatile storage device, receive a second PDL command including a process execution instruction and authentication information, execute a process in accordance with a result of interpretation of the process execution instruction included in the second PDL command in a case where the authentication information included in the second PDL command coincides with the authentication information stored in the volatile storage device, control a setting screen for inputting authentication information to be set in the interpreter to be displayed on a display, store authentication information input through the setting screen in a nonvolatile storage device, and store the authentication information stored in the nonvolatile storage device as authentication information of the interpreter in the volatile storage device at a predetermined timing.

Further features of the present invention will become apparent from the following description of exemplary embodiments with reference to the attached drawings.

DESCRIPTION OF THE EMBODIMENTS

Hereinafter, embodiments of the present disclosure will be described with reference to the accompanying drawings.

First Embodiment

An outline of a method for controlling a PS password will be described with reference to FIGS. 1A and 1B.

Figure 1A:
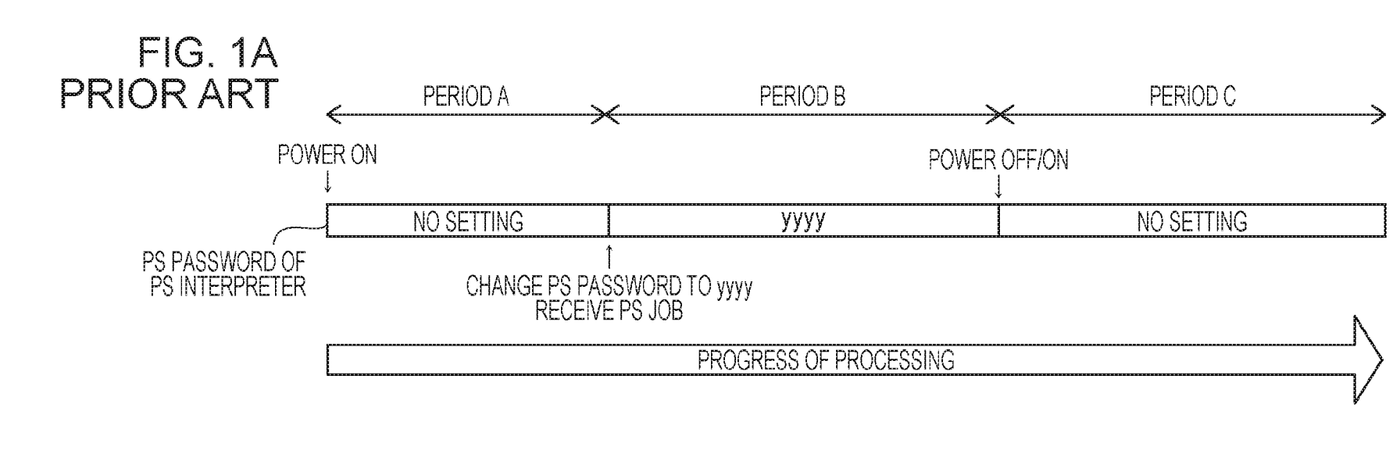
FIG. 1A is a diagram illustrating outline of a method for controlling a PS password setting in the related art.

FIG. 1A is a diagram illustrating a method for controlling a PS password in a configuration in which only a method for changing a PS password specified by a PS command is supported according to the related art. More specifically, a time series variation of a PS password set in a PS printer is illustrated in FIG. 1A.

When the image forming apparatus serving as an information processing apparatus is powered on, the image forming apparatus is activated in a state in which the PS password of the PS interpreter is in a default setting, that is "no setting". In the state of "no setting", any password may be specified as the PS password required when system parameters of the PS interpreter are to be changed, and the system parameters may be changed by any password (Period A). Here, when receiving a PS job including a PS command for specifying a change of the PS password to "yyyy", the image forming apparatus changes the password of the PS interpreter to "yyyy" by executing the job. When the system parameters are to be changed in a next job onwards, this PS password "yyyy" is required to be specified (Period B). Thereafter, when the image forming apparatus is turned off and then turned on (reboot), the PS password returns to the default setting "no setting" (period C).

Specifically, even if the PS password is changed by executing the PS job, the changed PS password returns to the default state "no setting" by performing turning off and then turning on since the PS password is stored in a volatile region in the PS interpreter.

Figure 1B:
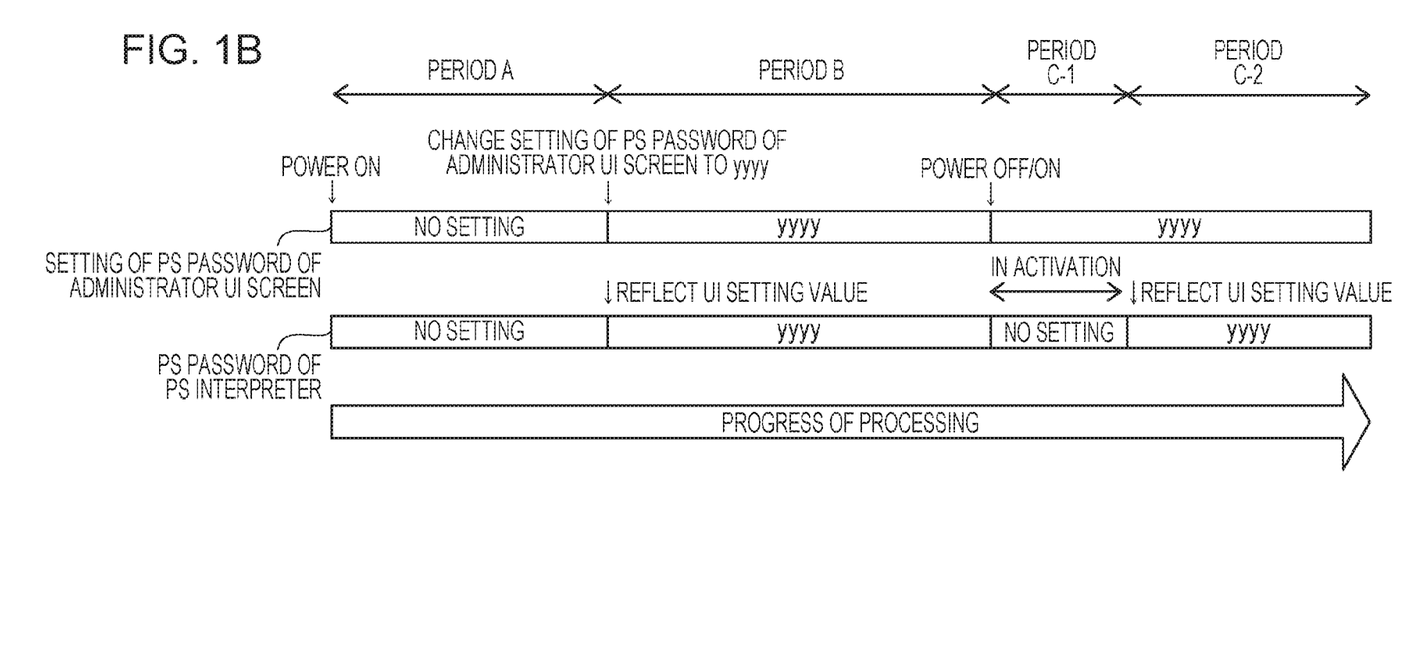
FIG. 1B is a diagram illustrating outline of a method for controlling a PS password setting according to a first embodiment.

FIG. 1B is a diagram illustrating a method for controlling a PS password setting in a configuration in which a method for changing a PS password in settings of a UI screen for an administrator is supported. More specifically, time series variation of a PS password set in an administrator UI and a PS password set in the PS interpreter is illustrated in FIG. 1B. The administrator UI screen is an example of a screen for an administrator. The administrator UI may be displayed when it is determined that a user has a certain authority (as an administrator) by user authentication or the like.

When the image forming apparatus is powered on while the PS password in the administrator UI screen is "no setting", the PS interpreter is activated while the PS password of the PS interpreter is in a default setting "no setting" (Period A). Subsequently, when a setting value of the PS password is changed to "yyyy" in the administrator UI screen, the image forming apparatus reflects the PS password to the PS interpreter (Period B). Here, the setting value of the PS password set in the administrator UI screen is stored in a nonvolatile region of memory, and therefore, the value is maintained even when the power is turned off and then on. Thereafter, although the setting value "yyyy" of the PS password in the administrator UI screen is maintained when the image forming apparatus is turned off and then on, the PS password of the PS interpreter returns to the default setting "no setting". However, the image forming apparatus performs a process of reflecting the PS password set in the administrator UI screen to the PS interpreter while an activation process is performed (Period C-1). Thereafter, when a state in which a PS job is acceptable is entered after the activation of the image forming apparatus is completed, the PS password set in the PS interpreter is changed to "yyyy" (Period C-2). Therefore, in this embodiment, the state in which the password "yyyy" of the PS interpreter is maintained even after the image forming apparatus is rebooted. The PS interpreter is an example of an interpreter which performs language interruption on a print job described in a page description language.

System Configuration

Figure 2:
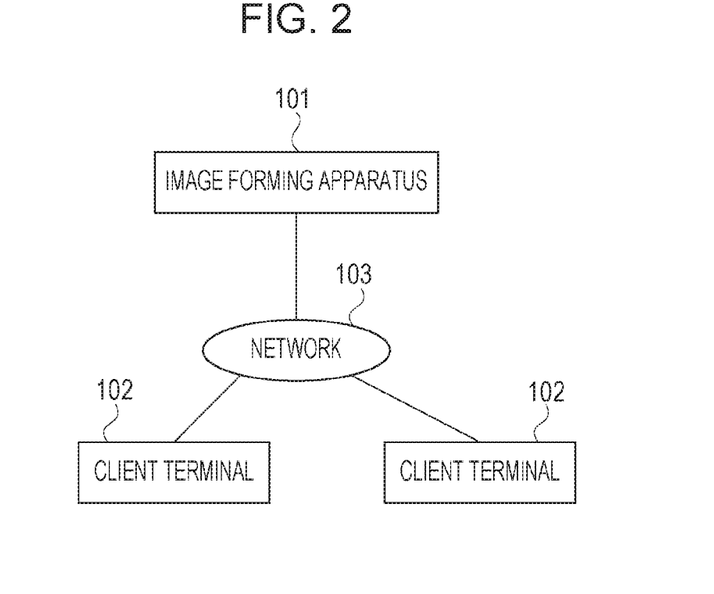
FIG. 2 is a diagram illustrating an example of a system configuration of an image processing system.

FIG. 2 is a diagram illustrating an example of a configuration of an image processing system. The image processing system according to this embodiment includes an image forming apparatus 101 and a plurality of client terminals 102. The image forming apparatus 101 is connected to the client terminals 102 through a network 103.

The image forming apparatus 101 is a multifunction peripheral having various functions including a scanning function, a FAX function, a print function, and a copy function or a printer only having a print function.

The client terminals 102 are mobile terminals, such as a personal computer (PC), a cellular phone, a personal digital assistance (PDA), a multifunction cellular phone, or a tablet, which are possession of users. The client terminals 102 transmit print data to the image forming apparatus 101 through the network 103.

The network 103 is a wireless or wired network formed as a wide area network (WAN) or a local area network (LAN).

Hardware Configuration of Image Forming Apparatus

Figure 3:
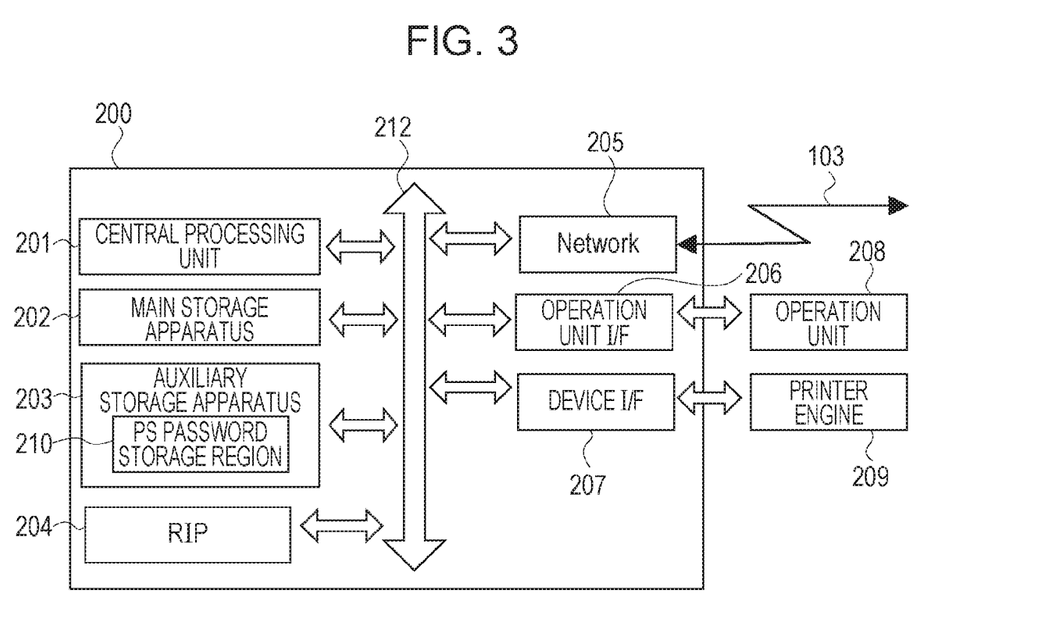
FIG. 3 is a diagram illustrating an example of a hardware configuration of an image forming apparatus.

FIG. 3 is a diagram illustrating an example of a hardware configuration of the image forming apparatus 101.

A controller unit 200 controls input and output of image signals and device information.

A central processing unit (CPU) 201 reads a program stored in an auxiliary storage apparatus 203 into a main storage apparatus 202 and executes the program. Furthermore, the CPU 201 integrally controls devices connected to a system bus 212.

The main storage apparatus 202 functions as a main memory and a work memory of the CPU 201. The main storage apparatus 202 is a volatile storage device which stores the PS password. The main storage apparatus 202 stores authentication information set in accordance with a first page description language (PDL) command described below. The first PDL command is issued to instruct a setting of the authentication information to a data interrupter 302.

The auxiliary storage apparatus 203 is also used to store data. Examples of the auxiliary storage apparatus 203 include a nonvolatile memory. A nonvolatile region described below is a partial region of the auxiliary storage apparatus 203. The information on the PS password described in the administrator UI screen in this embodiment is stored in a PS password storage region 210 which is a portion of the auxiliary storage apparatus 203. The auxiliary storage apparatus 203 operates as a nonvolatile storage unit which stores authentication information (the PS password) input through a setting screen.

A raster image processor (RIP) 204 is hardware dedicated for development of intermediate print data into a raster image.

The RIP 204 processes intermediate print data generated in the main storage apparatus 202 by the CPU 201 in parallel to execution on the intermediate print data by the CPU 201.

A network 205 is connected to the network 103 and inputs print data and device information from and output the print data and the device information to an outside of the printer. The network 205 receives instructions, such as a print instruction. The instructions are described by PDL.

Examples of the PDL include POSTSCRIPT. The network 205 receives a first PDL command for instructing a setting of authentication information to an interpreter described below. The network 205 further receives a second PDL command including processing execution instructions and the authentication information.

The CPU 201 functions as a processor which executes a process in accordance with a result of interruption on a processing execution instruction included in the second PDL command when authentication information included in the received second PDL command coincides with authentication information stored in the main storage apparatus 202.

An operation unit interface (I/F) 206 serving as an interface relative to an operation unit 208 outputs image data to be displayed in the operation unit 208 to the operation unit 208. The operation unit I/F 206 performs control such that a setting screen for inputting authentication information to be set to the data interrupter 302 is displayed in a display unit. Although a case where the setting screen is displayed in the display unit included in the operation unit 208 is described as an example in this embodiment, the setting screen may be displayed in a display unit of a communication apparatus connected to the image forming apparatus 101 through a network. Furthermore, the operation unit I/F 206 transmits information input by the user of the image forming apparatus 101 using the operation unit 208 to the CPU 201.

A device I/F 207 performs transmission of an image signal, an instruction of a device operation, and reception of device information in accordance with instructions issued by the CPU 201. A controller unit 200 is connected to a printer engine 209 through the device I/F 207.

The operation unit 208 includes a liquid crystal panel and a sound source as output devices and a touch panel, hardware keys, and a microphone as input devices.

The printer engine 209 is an output device which outputs an image signal supplied from the controller unit 200 to a medium and may employ an electrophotographic method or an inkjet method.

When the CPU 201 executes processes based on programs stored in the auxiliary storage apparatus 203, a software configuration of FIG. 4 described below and information processes in FIGS. 6 and 7 described below are realized.

Software Configuration of Image Forming Apparatus

Figure 4:
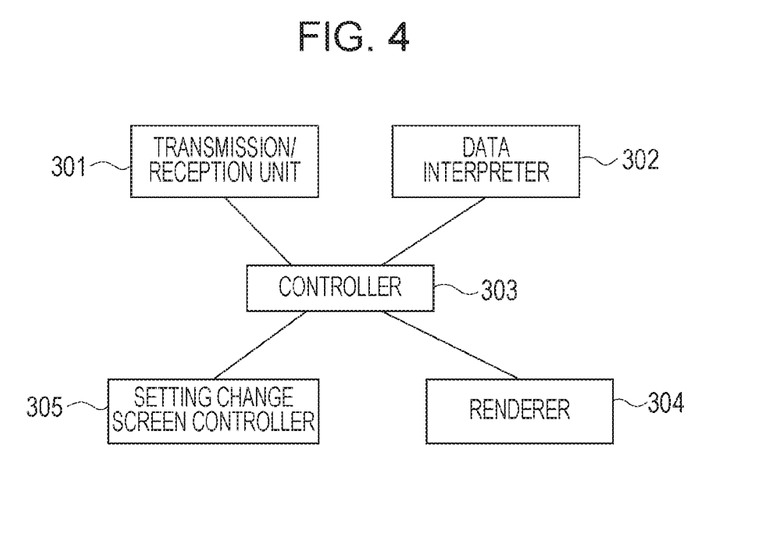
FIG. 4 is a diagram illustrating an example of a software configuration of the image forming apparatus.

FIG. 4 is a diagram illustrating an example of a software configuration of the image forming apparatus 101.

A transmission/reception unit 301 receives print data from the network 205.

The data interrupter 302 reads the print data supplied from the transmission/reception unit 301 through a controller 303 and interprets rendering information included in the print data. The data interrupter 302 interprets a PDL command described by a predetermined PDL. In this embodiment, the predetermined page description language is POSTSCRIPT. The data interrupter 302 operates as a POSTSCRIPT interpreter. Rendering information extracted as a result of the data interpretation process is transmitted to a renderer 304 through the controller 303 and used in a rendering process.

The controller 303 controls various processes including reception of print data, data interpretation, display of the administrator UI screen, and rendering of an image.

The renderer 304 uses the RIP 204 to generate a bitmap image from the rendering information supplied from the data interrupter 302. The generated bitmap image is supplied to the printer engine 209 through the device I/F 207, and an image forming process is executed on a print sheet.

A setting change screen controller 305 controls the administrator UI screen which may be accessed only by the administrator. A process of controlling a PS password setting screen including a PS password setting change screen which accepts a change of the setting of the PS password of the PS interpreter will be described in detail hereinafter with reference to FIGS. 5 and 6.

The image forming apparatus 101 includes a PS interpreter, for example, in addition to the components illustrated in FIG. 4.

Administrator UI Screen (PS Password Setting Screen)

Figure 5:
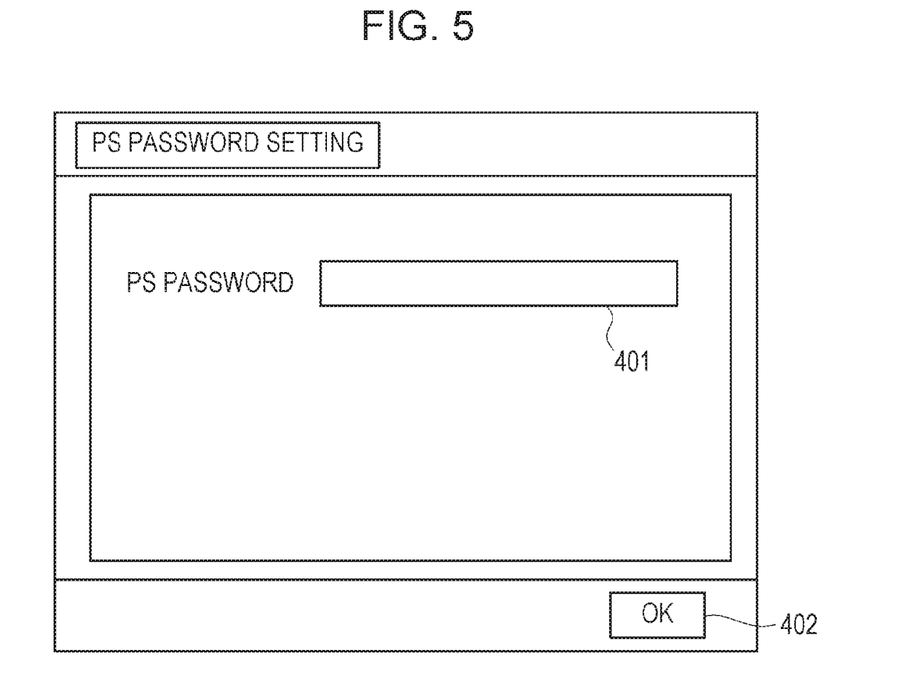
FIG. 5 is a diagram (part I) illustrating an example of a UI screen for an administrator.

FIG. 5 is a diagram illustrating an example of the administrator UI screen which may be accessed only by the administrator of the image forming apparatus. More specifically, the administrator UI screen is a PS password setting screen which allows a change of the PS password of the PS interpreter. It is assumed that the administrator UI screen is displayed in the operation unit 208 after an authentication process, such as password authentication, is performed so that only the administrator may be accessed. In the administrator UI screen, setting items for managing systems of various image forming apparatuses, not illustrated, may be changed. However, the administrator displays this screen when the administrator intends to change a setting of the PS password in this embodiment. The setting change screen controller 305 displays the administrator UI screen of FIG. 5 in the operation unit 208 when receiving a predetermined operation through the operation unit 208. An input field 401 is used to set the PS password of the PS interpreter. The administrator inputs a character string of the PS password in the input field 401 and selects an OK button 402. Then the input PS password is stored in the PS password storage region 210.

Process of Changing PS Password Setting in Administrator UI Screen

Figure 6:
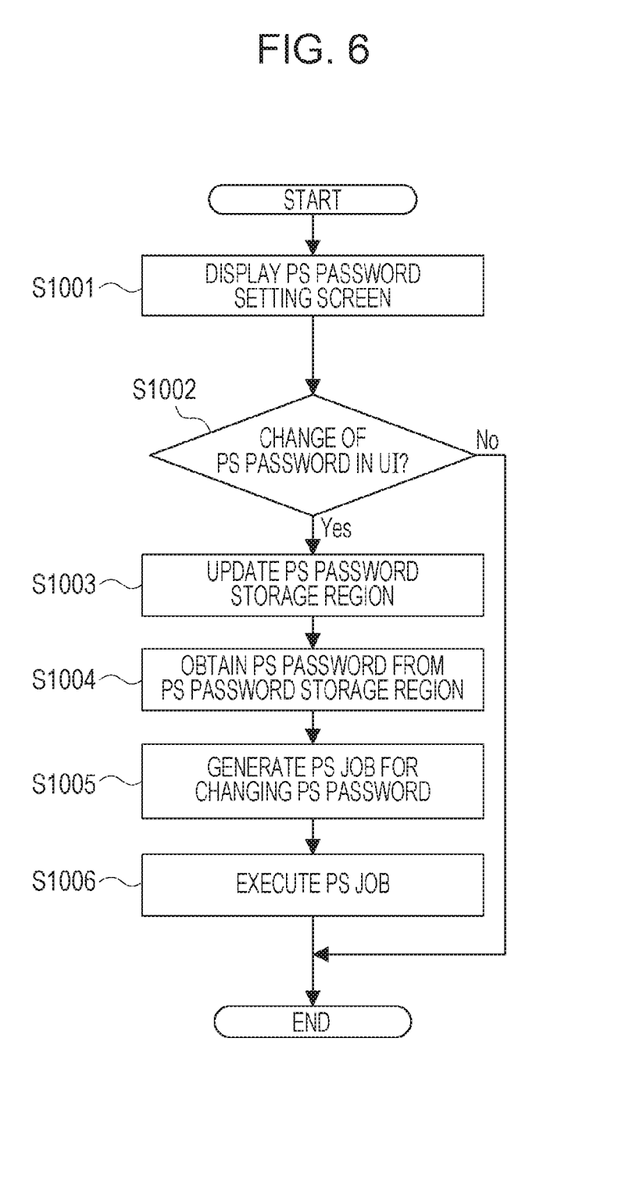
FIG. 6 is a flowchart of an example of a process of changing a PS password setting.

FIG. 6 is a flowchart of an example of a process of changing a PS password setting. The flowchart of FIG. 6 is started when the administrator of the image forming apparatus 101 accesses the administrator UI screen and selects a button, not illustrated, for displaying the PS password setting screen to change the PS password of the PS interpreter in a menu for the administrator.

In S1001, the CPU 201 displays the PS password setting screen of FIG. 5 in the operation unit 208. The process in step S1001 is an example of a display control process of displaying the administrator screen in the operation unit 208.

In step S1002, the CPU 201 determines whether a setting change has been performed by inputting a character string of the password in the input field 401 of FIG. 5 and selecting the OK button 402 by a user operation. Here, the CPU 201 determines that the setting change has not been performed when a previous setting is not changed even though the character string has been input. When the CPU 201 determines that the setting change has been performed, the process proceeds to step S1003, and otherwise, the process in the flowchart of FIG. 6 is terminated.

In step S1003, the CPU 201 updates the PS password stored in the PS password storage region 210 of the auxiliary storage apparatus 203 to the character string input in the input field 401. Since the PS password storage region 210 is a nonvolatile region, even when the image forming apparatus 101 is turned off, the value set in the PS password storage region 210 is maintained.

In step S1004, the CPU 201 obtains the PS password stored in the PS password storage region 210.

In step S1005, the CPU 201 generates a PS job for a change to the obtained PS password. The process will be described in detail hereinafter.

In step S1006, the CPU 201 executes the generated PS job and updates the PS password of the PS interpreter.

When the PS password is set in the administrator UI screen by the process described above, a process of reflecting the password to the PS interpreter is executed.

Flowchart of Process When Image Forming Apparatus is Turned On

Figure 7:
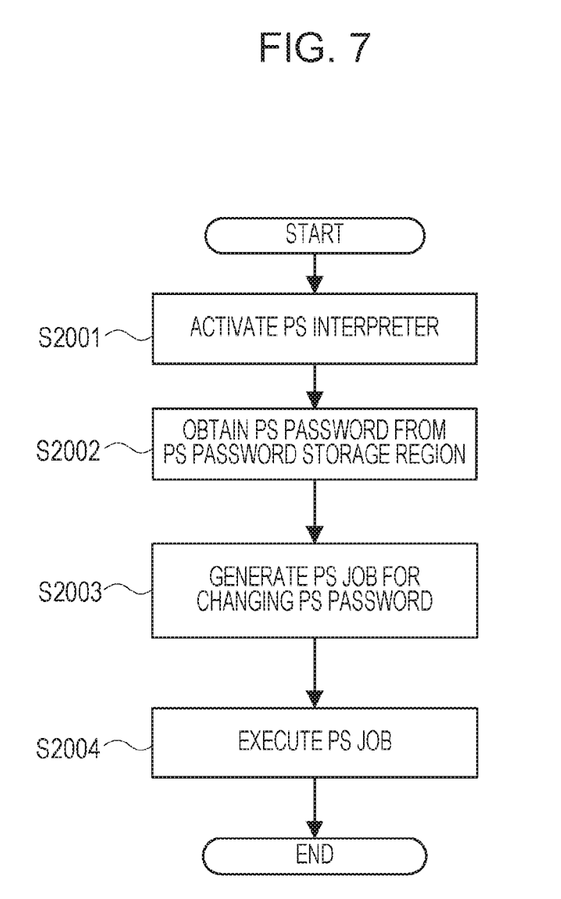
FIG. 7 is a flowchart of an example of a process of setting a PS password.

FIG. 7 is a flowchart of an example of a process of setting the PS password performed when the image forming apparatus 101 is turned on. When a power switch of the image forming apparatus 101 is turned on, the process in the flowchart of FIG. 7 is started.

In step S2001, the CPU 201 activates the PS interpreter. In this case, a password of the PS interpreter is in the "no setting" state.

In step S2002, the CPU 201 obtains the PS password stored in the PS password storage region 210.

In step S2003, the CPU 201 generates a PS job for a change to the obtained PS password. The process will be described in detail hereinafter.

In step S2004, the CPU 201 executes the generated PS job and updates the PS password of the PS interpreter.

By the process described above, when the image forming apparatus 101 is turned on, the password set in the PS password storage region which is the nonvolatile storage region is reflected to the PS password of the PS interpreter. Specifically, the PS password is stored in the main storage apparatus 202 as the PS password of the PS interpreter. Accordingly, even when the image forming apparatus 101 is turned off and then turned on, the PS password set in the administrator UI is maintained in the PS interpreter.

In this way, the CPU 201 stores the PS password stored in the nonvolatile auxiliary storage apparatus 203 when the image forming apparatus 101 is activated in the main storage apparatus 202 as authentication information of the data interrupter 302.

Method for Reflecting PS Password in PS Interpreter

In this embodiment, when the PS password is set in the PS password setting of the administrator UI screen, a PS command below is internally issued and interpreted by the PS interpreter so that the PS password setting is reflected to the PS interpreter.

«/Password(oldpassword)/SystemParamsPassword(newpassword)»setsystemparams

When a PS password is to be changed, a current PS password ("oldpassword" in the example described above) is required. Therefore, the CPU 201 obtains the current PS password from the PS interpreter and assigns the current PS password to "oldpassword" described above. The CPU 201 assigns the character string set in the PS password setting of the administrator UI screen to an updated PS password ("newpassword" in the example described above).

Since the PS interpreter performs language interpretation on the PS command internally issued so that the PS password is changed, the PS password may be reflected to the PS interpreter.

According to the foregoing embodiment, even when the image forming apparatus 101 is rebooted, the authentication information set by the administrator may be maintained. Accordingly, the settings of the image forming apparatus 1010 are prevented from being changed by a malicious user before the PS password is reset after the image forming apparatus 101 is rebooted.

Second Embodiment

In the first embodiment, the operation of changing the PS password settable in the PS interpreter using the administrator UI screen is described. When the PS password is described in detail here, the PS password includes two types of password, that is, "SystemParamsPassword." and "StartJobPassword". The password "SystemParamsPassword" permits a change of system parameters. The password "StartJobPassword" permits execution of a "startjob" operator and an "exitserver" operator in the PS command. Therefore, both of the passwords may be set in the administrator screen. An example of a UI for the setting is illustrated in FIG. 8.

Figure 8:
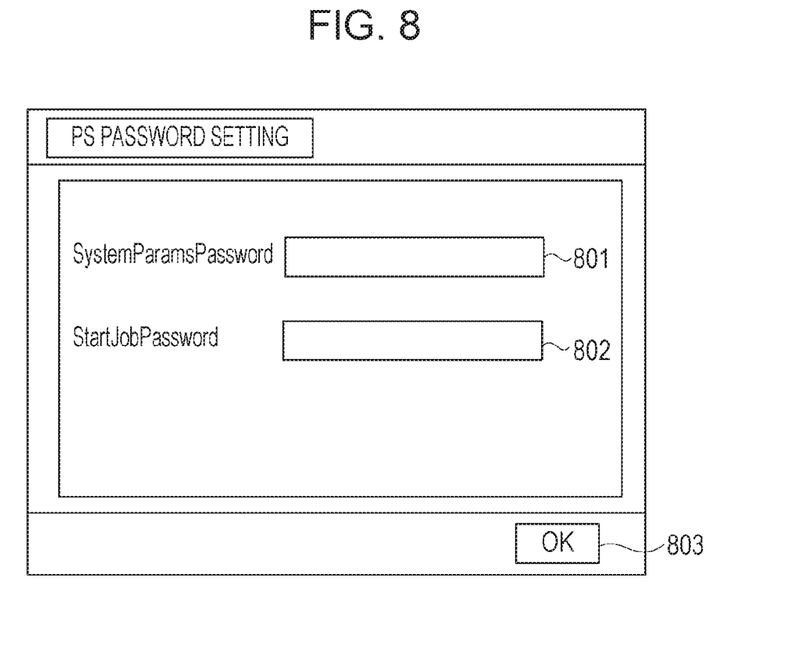
FIG. 8 is a diagram (part II) illustrating an example of a UI screen for an administrator.

As with FIG. 5, FIG. 8 is a diagram illustrating an example of an administrator UI screen which may be accessed only by an administrator of an image forming apparatus. An input field 801 is used to set the PS password "SystemParamsPassword". An input field 802 is used to set the PS password "StartJobPassword". The administrator inputs character strings in the input fields 801 and 802 and selects an OK button 803. Then the input password is stored in a PS password storage region 210. The control for reflecting the input password to the PS interpreter is the same as that of the first embodiment.

Figure 9:
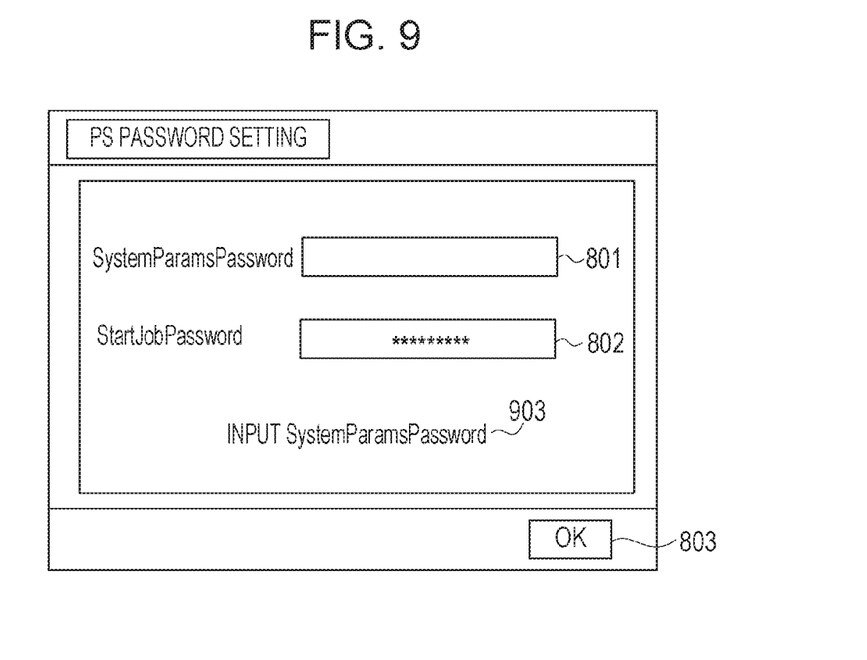
FIG. 9 is a diagram (part III) illustrating an example of a UI screen for an administrator.

Furthermore, as for the password "StartJobPassword" which permits execution of the "startjob" operator and the "exitserver" operator, even when the password "StartJobPassword" is set, if the password "SystemParamsPassword" is not set, the execution of the "startjob" operator and the "exitserver" operator is permitted. To avoid this state, when the OK button 803 is selected in a state in which a character string is set only in the input field 802 corresponding to the password "StartJobPassword", the CPU 201 may display a message for prompting a setting of the password "SystemParamsPassword" as illustrated in FIG. 9. In this way, the CPU 201 displays a message for prompting input of the password "SystemParamsPassword" in a display unit in a case where the password "StartJobPassword" has been input but the password "SystemParamsPassword" has not been input in the setting screen.

By the process described above, the PS passwords "SystemParamsPassword" and "StartJobPassword" may be set in the administrator UI screen.

A process to be performed when the setting is changed by the PS command after the PS password is set in the administrator UI screen is not particularly limited. The password updated in accordance with the PS command may be applied until the image forming apparatus 101 is turned off and then rebooted after the setting is changed in accordance with the PS command. Alternatively, even if the setting is changed in accordance with the PS command, the PS password set in the administrator UI screen may be enabled every time a job is started.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

Although the embodiments of the present disclosure have been described in detail hereinabove, the present disclosure is not limited to the specific embodiments.

A plurality of central processing units may be included in the image forming apparatus 101 as a hardware configuration, and the plurality of central processing units may execute processes based on programs stored in an auxiliary storage apparatus, for example. Furthermore, a graphics processing unit (GPU) may be used in place of the central processing unit as the hardware configuration of the image forming apparatus 101.

Furthermore, a portion of the software configuration of the image forming apparatus 101 may be implemented as a hardware configuration in the image forming apparatus 101.

As described above, according to the foregoing embodiments, the administrator may maintain the set authentication information even after rebooting.

While the present in has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-180347 filed Sep. 20, 2017, which is hereby incorporated by reference herein in its entirety.

What is claimed is:

1. An information processing apparatus including at least one processor, a volatile storage device and a non-volatile storage device, wherein an interpreter of a page description language (PDL) command is loaded by the at least one processor, the information processing apparatus comprising:
the at least one processor configured to:
provide to the interpreter a first PDL command that is received from an external apparatus and that includes an instruction for setting first authentication information to the interpreter, wherein the first authentication information is authentication information for the interpreter to permit a change of setting of the interpreter, and the interpreter
stores the first authentication information in the volatile storage device by interpreting the first PDL command;
control a display to display a setting screen for enabling a user to input second authentication information to be set to the interpreter;
store the second authentication information input through the setting screen in the non-volatile storage device; and
each time the apparatus is powered on, read the second authentication information from the non-volatile storage device and generate and provide a second PDL command that includes an instruction for setting the read second authentication information to the interpreter unless the second authentication information is replaced with different authentication information, wherein the interpreter stores the second authentication information in the volatile storage device by interpreting the second PDL command.

2. The information processing apparatus according to claim 1, wherein
the at least one processor is configured to:
store the authentication information stored in the non-volatile storage device as authentication information of the interpreter in the volatile storage device when the information processing apparatus is activated.

3. The information processing apparatus according to claim 1, wherein
the at least one processor is configured to:
obtain the authentication information stored in the non-volatile storage device when the information processing apparatus is activated; and
store the authentication information in the volatile storage device by executing a job for setting the obtained authentication information in the interpreter.

4. The information processing apparatus according to claim 1, wherein
first authentication information required for changing system parameters is set through the setting screen and second authentication information required for instructing execution of a predetermined command is set through the setting screen.

5. The information processing apparatus according to claim 1, wherein
the at least one processor is configured to:
display the setting screen when it is determined that a user has predetermined authority.

6. The information processing apparatus according to claim 1, wherein the predetermined PDL is POSTSCRIPT and the interpreter is a POSTSCRIPT interpreter.

7. The information processing apparatus according to claim 1, wherein the authentication information is a POSTSCRIPT password.

8. The information processing apparatus according to claim 7, wherein the PostScript password includes a first POSTSCRIPT password and a second POSTSCRIPT password different from the first PostScript password.

9. The information processing apparatus according to claim 8, wherein
the at least one processor is configured to:
display a message for prompting input of the first POSTSCRIPT password in the display in a case where the second POSTSCRIPT password has been input but the first POSTSCRIPT password has not been input.

10. A method for controlling an information processing apparatus including at least one processor, a volatile storage device and a non-volatile storage device, wherein an interpreter of a page description language (PDL) command is loaded by to at least one processor, the method comprising:
provide to the interpreter a first PDL command that is received from an external apparatus and that includes an instruction for setting first authentication information to the interpreter for the interpreter to permit a change of setting of the interpreter;

storing, by the interpreter, the first authentication information in the volatile storage device by interpreting the first PDL command;

controlling a display to display a setting screen for enabling a user to input second authentication information to be set to the interpreter;

storing the second authentication information input through the setting screen in the nonvolatile storage device; and each time the apparatus is powered on, reading the second authentication information from the non-volatile storage device and generating and providing a second PDL command that includes an instruction for setting the read second authentication information to the interpreter unless the second authentication information is replaced with different authentication information, wherein the interpreter stores the second authentication information in the volatile storage device by interpreting the second PDL command.

11. The apparatus according to claim 1, wherein the at least one processor is configured to, based on the inputting of the second authentication information through the setting screen, generate and provide the second PDL command that includes an instruction for setting the read second authentication information to the interpreter, wherein the interpreter stores the second authentication information in the volatile storage device by interpreting the second PDL command.

12. The apparatus according to claim 1, wherein the interpreter of the PDL command is loaded in the volatile storage device by the at least one processor.

13. The apparatus according to claim 1, wherein the at least one processor is configured to provide to the interpreter a third PDL command that is received from an external apparatus and that includes an instruction for changing setting of the interpreter and includes third authentication information, wherein the interpreter interprets the third PDL command, and based on the interpretation, changes the setting of the interpreter in a case where the second authentication information coincides with the authentication information currently stored in the volatile storage device.

14. The apparatus according to claim 1, wherein the first authentication information stored in the volatile storage device is lost from the apparatus when the apparatus is powered off, and the second authentication information stored in the non-volatile storage device is held in the apparatus when the apparatus is powered off.

15. An information processing apparatus including at least one processor, a volatile storage device and a non-volatile storage device, wherein an interpreter of a PDL command is loaded by the at least one processor, the apparatus comprising:

the at least one processor configured to:

provide to the interpreter a first PDL command that is received from an external apparatus and that includes an instruction for setting first authentication information to the interpreter, wherein the first authentication information is authentication information for the interpreter to permit a change of setting of the interpreter, and the interpreter stores the first authentication information in the volatile storage device by interpreting the first PDL command;

control a display to display a setting screen for enabling a user to input second authentication information to be set to the interpreter;

store the second authentication information input through the setting screen in the non-volatile storage device; and based on powering on of the apparatus, read the second authentication information from the non-volatile storage device and generate and provide a second PDL command that includes an instruction for setting the read second authentication information to the interpreter.

16. The apparatus according to claim 15, wherein the at least one processor is configured to, based on the inputting of the second authentication information through the setting screen, generate and provide the second PDL command that includes an instruction for setting the read second authentication information to the interpreter, wherein the interpreter stores the second authentication information in the volatile storage device by interpreting the second PDL command.

17. The apparatus according to claim 15, wherein the interpreter of the PDL command is loaded in the volatile storage device by the at least one processor.

18. The apparatus according to claim 15, wherein the at least one processor is configured to provide to the interpreter a third PDL command that is received from an external apparatus and that includes an instruction for changing setting of the interpreter and includes third authentication information, wherein the interpreter interprets the third PDL command, and based on the interpretation, changes the setting of the interpreter in a case where the second authentication information coincides with the authentication information currently stored in the volatile storage device.

19. The apparatus according to claim 15, wherein the first authentication information stored in the volatile storage device is lost from the apparatus when the apparatus is powered off, and the second authentication information stored in the non-volatile storage device is held in the apparatus when the apparatus is powered off.

* * * * *